United States Patent
Ito et al.

(10) Patent No.: US 8,135,089 B2
(45) Date of Patent: Mar. 13, 2012

(54) DIGITAL TRANSMISSION APPARATUS

(75) Inventors: Keiju Ito, Kodaira (JP); Yoshimasa Kinoshita, Kodaira (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 538 days.

(21) Appl. No.: 12/364,861

(22) Filed: Feb. 3, 2009

(65) Prior Publication Data
US 2009/0225896 A1    Sep. 10, 2009

(30) Foreign Application Priority Data
Mar. 5, 2008    (JP) .................. 2008-055595

(51) Int. Cl.
*H04L 27/00*    (2006.01)
(52) U.S. Cl. ........ 375/295; 375/267; 375/299; 455/500; 455/504; 455/501; 455/63.1; 455/102; 455/105; 455/115.3
(58) Field of Classification Search .................. 375/267, 375/295, 299; 455/500, 504, 501, 63.1, 11, 455/102, 105, 115.3
See application file for complete search history.

(56) References Cited

U.S. PATENT DOCUMENTS
| | | | | |
|---|---|---|---|---|
| 5,818,846 A | * | 10/1998 | Mori et al. | 370/532 |
| 2007/0160163 A1 | * | 7/2007 | Majima | 375/295 |
| 2010/0023834 A1 | * | 1/2010 | Richardson et al. | 714/751 |

FOREIGN PATENT DOCUMENTS
| | | |
|---|---|---|
| JP | 08-205105 | 8/1996 |
| JP | 2000-022549 | 1/2000 |

* cited by examiner

*Primary Examiner* — Khanh C Tran
*Assistant Examiner* — Rahel Guarino
(74) *Attorney, Agent, or Firm* — Brundidge & Stanger, P.C.

(57) ABSTRACT

A digital transmission apparatus having a base unit constructed in such a manner that n-bit digital signals transmitted from a plurality of (N) remote units are extended into ($n+\log_2 N$) bits in corresponding bit extending units, with respect to an addition result in an adding unit, an arithmetic operation of $(2^{n-1}-1)/|\text{addition result}|$ is executed in a gain arithmetic operating unit, when an arithmetic operation result is smaller than "1", the arithmetic operation result is set into a gain coefficient, when the arithmetic operation result is equal to or larger than "1", "1" is set into the gain coefficient, further, the addition result is multiplied by the gain in a multiplying unit, and a bit contraction for discarding upper $\log_2 N$ bits excluding a sign bit and returning to n bits is executed in a bit contracting unit.

3 Claims, 5 Drawing Sheets

CONSTRUCTIONAL BLOCK DIAGRAM OF A DIGITAL TRANSMISSION APPARATUS ACCORDING TO AN EMBODIMENT OF THE INVENTION

BIT EXTENDING UNIT

BIT CONTRACTING UNIT

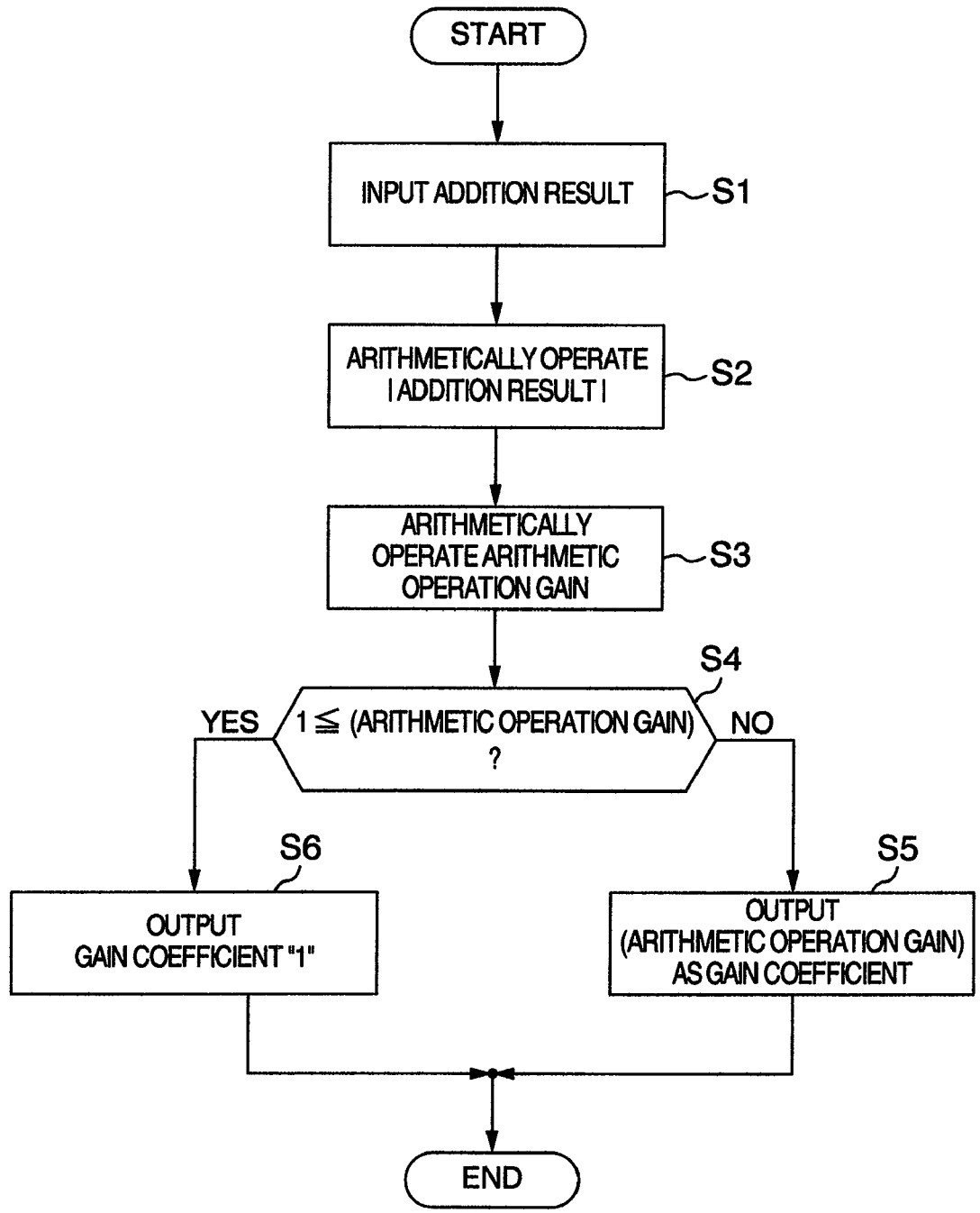

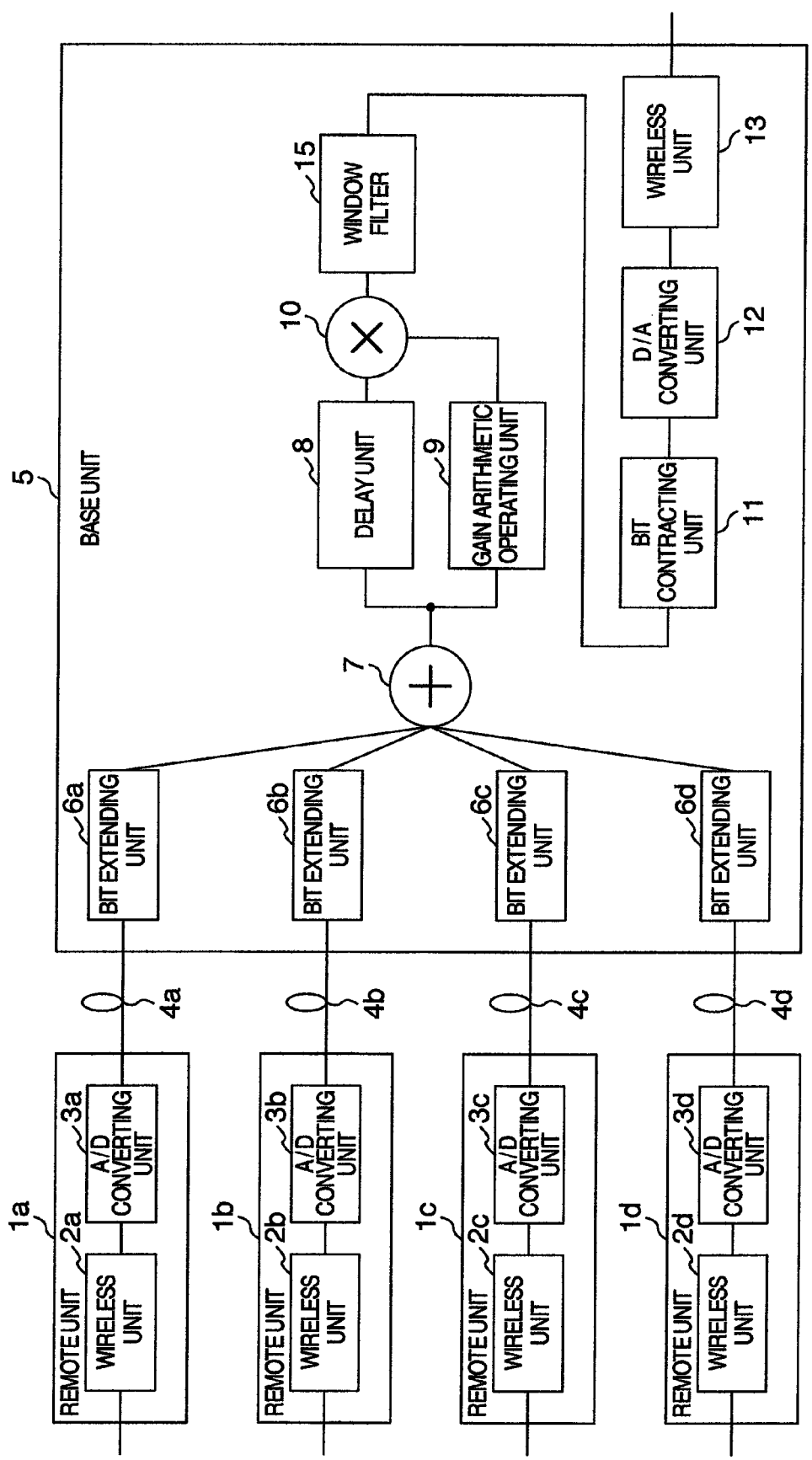

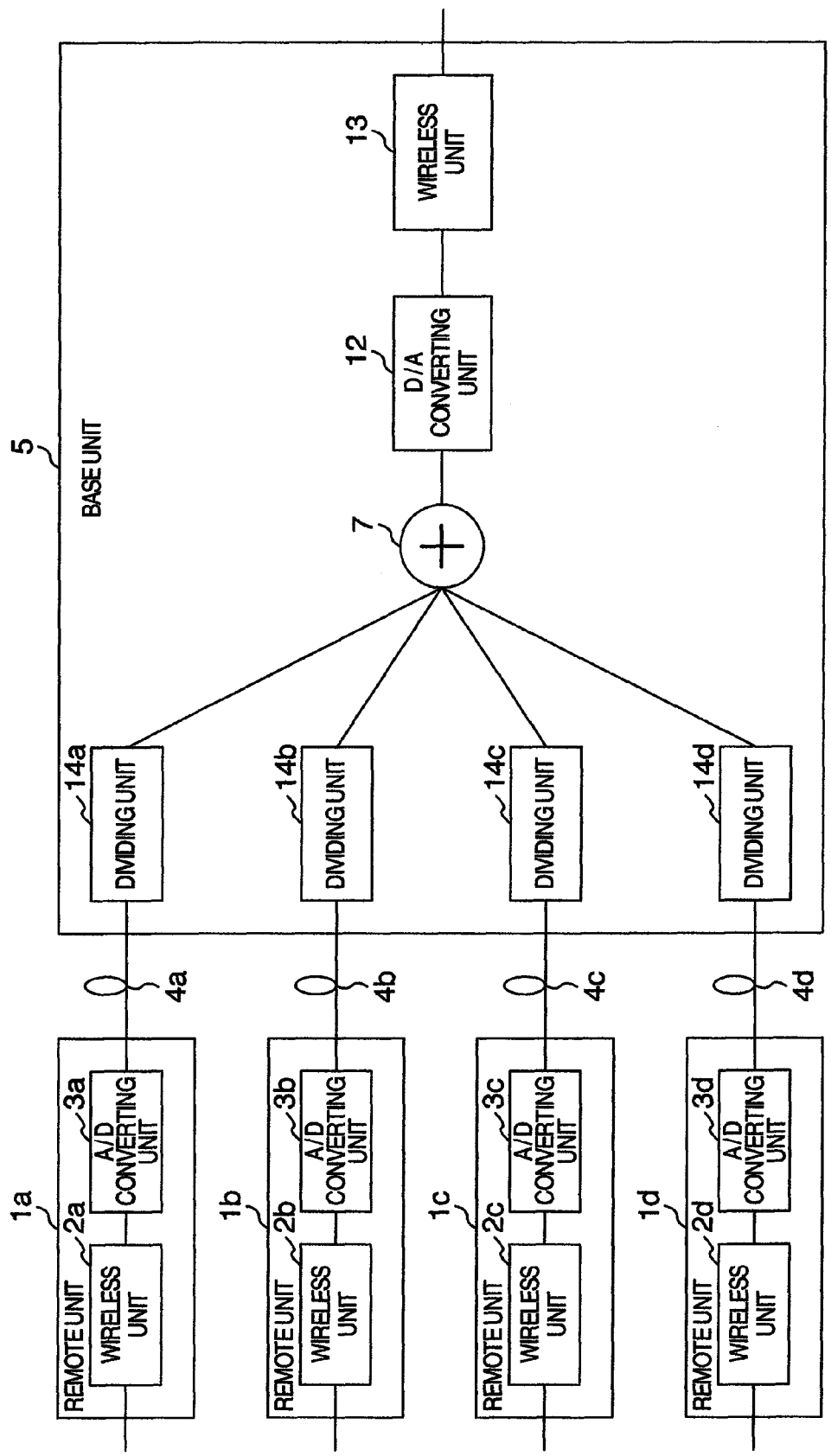

US 8,135,089 B2

DIGITAL TRANSMISSION APPARATUS

INCORPORATION BY REFERENCE

The present application claims priority from Japanese application JP2008-055595 filed on Mar. 5, 2008, the content of which is hereby incorporated by reference into this application.

BACKGROUND OF THE INVENTION

The invention relates to a digital transmission apparatus having a base unit for transmitting signals to/from a plurality of remote units and, more particularly, to a digital transmission apparatus which can obtain a maximum signal to noise ratio (hereinbelow, referred to as an S/N ratio) with respect to up signals from a plurality of remote units.

Hitherto, in a transmission apparatus, when a radio signal is transmitted as an electric signal as it is or is converted into an optical signal and subsequently transmitted, if it is transmitted at a long distance, signal quality deteriorates.

As a system for multiplexing different signals such as audio signal and video signal as digital signals and transmitting, there is a system disclosed in JP-A-8-205105.

According to JP-A-8-205105, the different signals are multiplexed and the signals are not synthesized.

In JP-A-2000-22549, there has been disclosed "quantization noise reducing device and bit length extending device" in which a quantization noise band is detected and only a quantization noise component can be reduced without attenuating a music signal component and a bit length extension which does not add a surplus incidental sound to a music signal is performed.

SUMMARY OF THE INVENTION

In the above transmission apparatus, a development of a digital transmission apparatus has been being progressed in recent years.

In the digital transmission apparatus, since a dynamic range which depends on the number of bits which are transmitted is finite, for example, in the case of synthesizing up signals from a plurality of remote units and transmitting, it is necessary to consider a problem such as an overflow or the like.

A digital transmission apparatus which considers the overflow will be described with reference to FIG. 6. FIG. 6 is a constructional block diagram of the digital transmission apparatus which considers the overflow.

The digital transmission apparatus of FIG. 6 is constructed by: remote units 1a to 1d; a base unit 5; and transmission media 4 each for connecting both of the remote unit and the base unit.

The remote unit 1 has: a wireless unit 2 having an antenna; and an A/D (analog to digital) converting unit 3.

The base unit 5 has: dividing units 14a to 14d corresponding to the remote units 1a to 1d; an adding unit 7; a D/A (digital to analog) converting unit 12; and a wireless unit 13.

Signals received by the antennas of the remote units 1a to 1d are amplified by the wireless units 2a to 2d, frequency converted, converted from the analog signals into digital signals by the A/D converting units 3a to 3d, outputted to the transmission media 4a to 4d, and transmitted to the base unit 5.

The digital signals from the remote units 1a to 1d are divided into 1/N by the dividing units 14a to 14d in accordance with the number N of connected remote units and synthesized by the adding unit 7 so that the overflow does not occur.

A signal from the adding unit 7 is converted from the digital signal into an analog signal by the D/A converting unit 12, frequency converted, amplified, and outputted by the wireless unit 13.

That is, in the digital transmission apparatus of FIG. 6, when the signals from a plurality of remote units are synthesized, they are respectively divided into 1/N in accordance with the number N of connected remote units and, thereafter, synthesized so that the overflow does not occur.

However, since the signal from each of the remote units is unconditionally divided into 1/N in accordance with the number N of connected remote units irrespective of a signal level, even when no overflow occurs, the signal is attenuated. There is consequently such a problem that the S/N ratio deteriorated without sufficiently utilizing the dynamic range of the digital signal.

The present invention is made in consideration of the above circumstances and it is an object of the invention to provide a digital transmission apparatus which can obtain a maximum S/N ratio with respect to up signals from a plurality of remote units.

To solve the above problem in the related arts, according to the invention, there is provided a digital transmission apparatus having a base unit for receiving n-bit digital signals from a plurality of (N) remote units, synthesizing those digital signals, and transmitting a synthesized signal, wherein the base unit comprises: a plurality of (N) bit extending units each for extending the digital signal from each remote unit from n bits to (n+log$_2$ N) bits; an adding unit for adding signals from the bit extending units; a gain arithmetic operating unit for executing an arithmetic operation of $(2^{n-1}-1)/|\text{addition result}|$ by using an addition result added by the adding unit, when an arithmetic operation result is smaller than "1", setting the arithmetic operation result into a gain coefficient, and when the arithmetic operation result is equal to or larger than "1", setting "1" into the gain coefficient; a multiplying unit for multiplying the addition result by the gain coefficient obtained by the gain arithmetic operating unit; a bit contracting unit for discarding upper log$_2$ N bits excluding a sign bit with respect to data multiplied by the multiplying unit and returning the data to n bits; a D/A converting unit for converting a signal from the bit contracting unit from the digital signal into an analog signal; and a wireless unit for frequency converting a signal from the D/A converting unit and amplifying a frequency converted signal.

According to the present invention, the signal processing in the digital transmission apparatus is as follows. The plurality of (N) bit extending units in the base unit extend the digital signals from the plurality of (N) remote units from n bits to (n+log$_2$ N) bits. The adding unit adds the signals from the bit extending units. The gain arithmetic operating unit executes the arithmetic operation of $(2^{n-1}-1)/|\text{addition result}|$ by using the addition result added by the adding unit. When the arithmetic operation result is smaller than "1", the arithmetic operation result is set into the gain coefficient. When the arithmetic operation result is equal to or larger than "1", "1" is set into the gain coefficient. The multiplying unit multiplies the addition result by the gain coefficient obtained by the gain arithmetic operating unit. The bit contracting unit discards the upper log$_2$ N bits excluding the sign bit with respect to the data multiplied by the multiplying unit and returns the data to n bits. The D/A converting unit converts the signal from the bit contracting unit from the digital signal into the analog signal. The wireless unit frequency converts the signal from the D/A converting unit and amplifies the frequency converted signal. There is, consequently, such an effect that the maximum S/N ratio can be obtained by sufficiently utilizing the dynamic range of the digital signal.

The invention is suitable for the digital transmission apparatus which can obtain the maximum S/N ratio with respect to the up signals from a plurality of remote units.

BRIEF DESCRIPTION OF THE DRAWINGS

FIG. 4 is a flowchart showing processes in a gain arithmetic operating unit;

FIG. 5 is a constructional block diagram of a digital transmission apparatus according to another embodiment of the invention; and FIG. 6 is a constructional block diagram of a digital transmission apparatus which considers an overflow.

DETAILED DESCRIPTION OF THE INVENTION

An embodiment of the invention will be described with reference to the drawings.

[Outline of Embodiment]

A digital transmission apparatus according to the embodiment of the present invention has a base unit constructed as follows. n-bit digital signals transmitted from a plurality of (N) remote units are extended to (n+$\log_2$ N) bits by corresponding bit extending units. With respect to an addition result in an adding unit, an arithmetic operation of ($2^{n-1}$−1)/|addition result| is executed in a gain arithmetic operating unit. When an arithmetic operation result is smaller than "1", the arithmetic operation result is set to a gain coefficient. When the arithmetic operation result is equal to or larger than "1", "1" is set to the gain coefficient. Further, in a multiplying unit, the addition result is multiplied by the gain. In a bit contracting unit, upper $\log_2$ N bits excluding a sign bit are discarded and the data is returned to n bits. A maximum S/N (signal to noise) ratio can be obtained with respect to up signals from a plurality of remote units.

[Whole Construction of the Present Apparatus]

Figure 1:
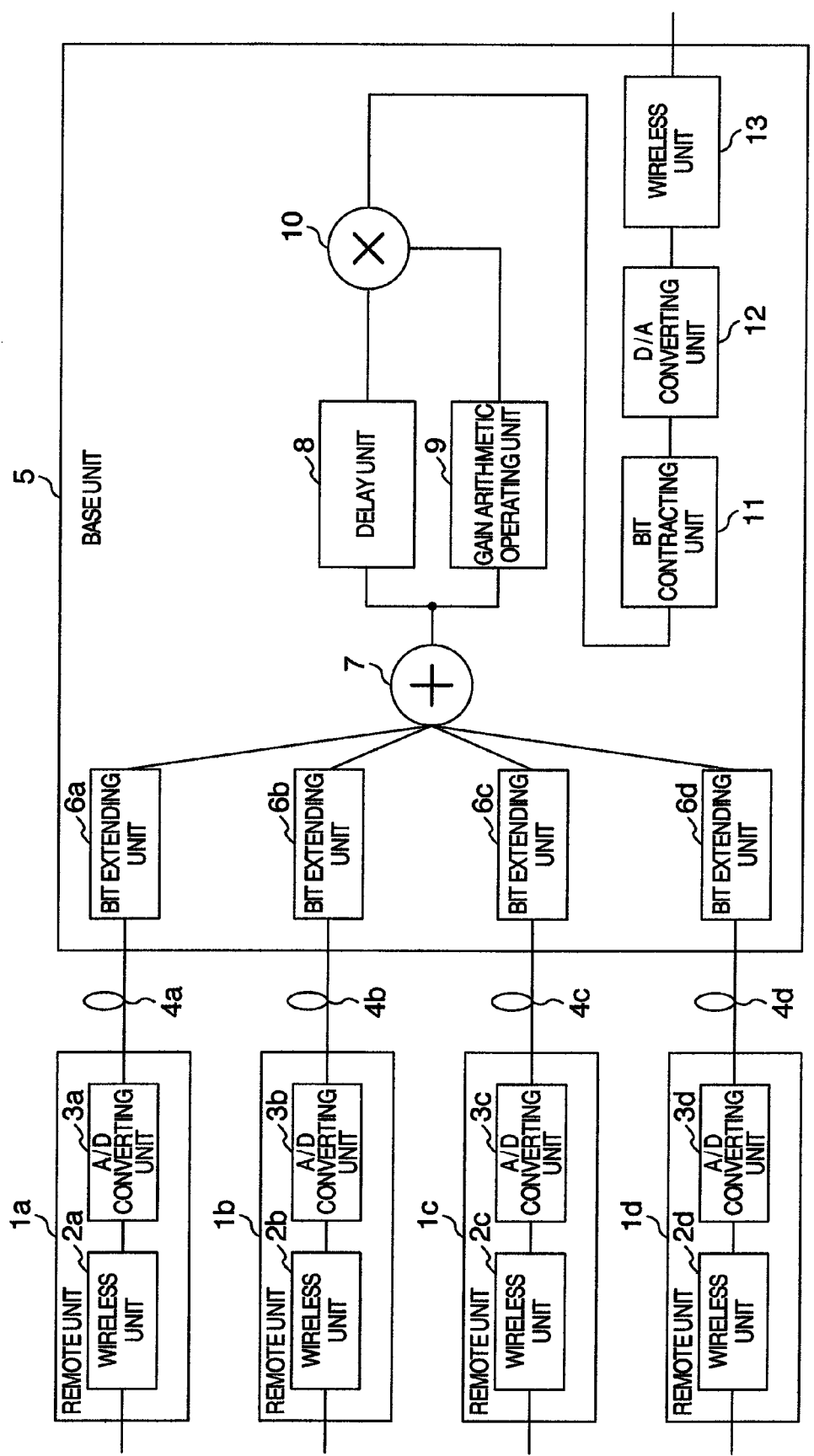
FIG. 1 is a constructional block diagram of a digital transmission apparatus according to an embodiment of the invention.

The digital transmission apparatus (the present apparatus) according to the embodiment of the invention will be described with reference to FIG. 1. FIG. 1 is a constructional block diagram of the digital transmission apparatus according to the embodiment of the invention.

As shown in FIG. 1, the present apparatus fundamentally has: the remote units 1a to 1d; the base unit 5; and the transmission media 4a to 4d such as optical fibers or the like each for connecting both of the remote unit and the base unit.

Although the four remote units and four transmission media corresponding thereto are illustrated as an example in FIG. 1, the number of remote units and the number of transmission media may be set to arbitrary numbers. An explanation will be made hereinbelow on the assumption that the number of remote units and the number of transmission media are equal to N.

[Remote Unit]

The remote unit 1 has: the wireless unit 2 having the antenna; and the A/D (analog to digital) converting unit 3.

The wireless unit 2 amplifies a signal inputted from the antenna and frequency converts the amplified signal.

The A/D converting unit 3 converts an analog signal from the wireless unit 2 into a digital signal of resolution of n bits.

[Base Unit]

The base unit 5 has: bit extending units 6a to 6d corresponding to the remote units 1a to 1d; the adding unit 7; a delay unit 8; a gain arithmetic operating unit 9; a multiplying unit 10; a bit contracting unit 11; a D/A (digital to analog) converting unit 12; and a wireless unit 13.

Each of the bit extending units 6a to 6d extends the digital signal transmitted from the remote unit from n bits to (n+$\log_2$ N) bits (fractions below a decimal point are rounded up). N pieces of bit extending units 6 are provided in correspondence to the number of remote units.

Now, assuming that n bits are set to 14 bits and N is equal to 4, n+$\log_2$ N=14+$\log_2$ 4=16. Therefore, the digital signal is extended to 16 bits.

The adding unit 7 adds signals from the N pieces of bit extending units 6.

The delay unit 8 temporarily holds and delays an output from the adding unit 7 for a time corresponding to an arithmetic operating process in the gain arithmetic operating unit 9 and outputs the delayed signal to the multiplying unit 10.

In accordance with a level of a signal inputted from the adding unit 7, the gain arithmetic operating unit 9 calculates a gain coefficient to be multiplied in the multiplying unit 10. A calculating method of the gain coefficient will be described hereinafter.

The multiplying unit 10 executes a process for multiplying the signal from the delay unit 8 by using a multiplication coefficient from the gain arithmetic operating unit 9 and rounding to (n+$\log_2$ N) bits.

That is, the multiplying unit 10 has multiplying means and rounding means. In the multiplying means, the (n+$\log_2$ N) bits are multiplied by the gain coefficient. In the rounding means, a bit discarding process is executed so that the number of bits of a multiplication result is equal to (n+$\log_2$ N) bits.

With respect to a signal from the multiplying unit 10, the bit contracting unit 11 contracts the signal from (n+$\log_2$ N) bits (fractions below a decimal point are rounded up) to n bits. Specifically speaking, the bit contraction is realized by discarding the bits of the number added in the bit extending unit 6 from upper bits excluding a sign bit.

The D/A (digital to analog) converting unit 12 converts a digital signal from the bit contracting unit 11 into an analog signal.

The wireless unit 13 frequency converts a signal from the D/A converting unit 12, amplifies, and outputs.

Figure 2:
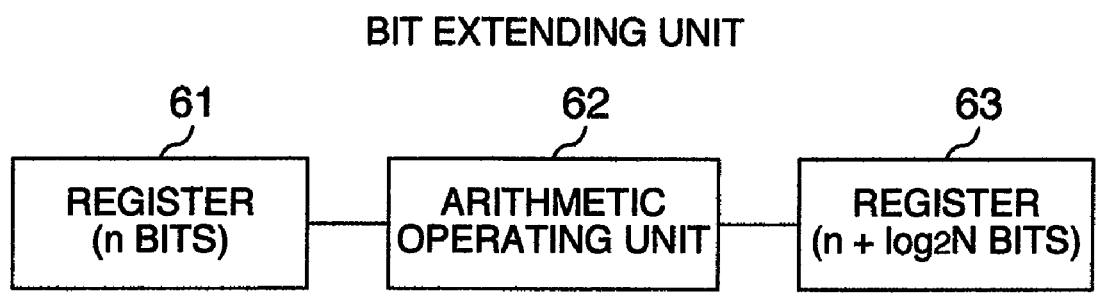
FIG. 2 is a constructional block diagram of a bit extending unit.

[Bit Extending Unit: FIG. 2]

Subsequently, the bit extending unit 6 will be described with reference to FIG. 2. FIG. 2 is a constructional block diagram of the bit extending unit.

As shown in FIG. 2, the bit extending unit 6 is constructed by: a register 61 of n bits; an arithmetic operating unit 62; and a register 63 of (n+$\log_2$ N) bits.

The arithmetic operating unit 62 adds $\log_2$ N bits to n bits of data in the register 61 and outputs the resultant data to the register 63.

In the case of processing the data in a complement format of 2, as a value of the most significant bit (here in below, referred to as an MSB), such values of the number as many as $\log_2$ N bits are formed and, thereafter, values of the MSB to the least significant bit (here in below, referred to as an LSB) among the n bits are added, thereby performing the bit extension.

For example, a process for converting four bits "0111" into six bits is realized as follows: two bits "00" are formed by continuing the MSB twice and the MSB to the LSB of four bits "0111" are synthesized thereto, thereby forming six bits "000111".

A process for converting four bits "1000" into six bits is realized as follows: two bits "11" are formed by continuing the MSB twice and the MSB to the LSB of four bits "1000" are synthesized thereto, thereby forming six bits "111000".

Figure 3:
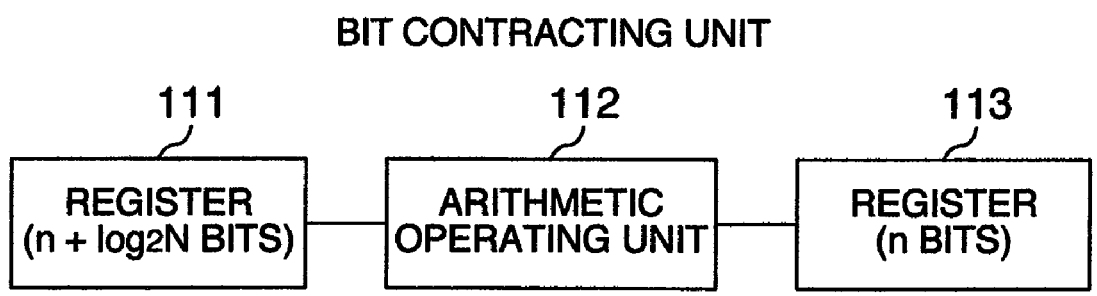
FIG. 3 is a constructional block diagram of a bit contracting unit.

[Bit Contracting Unit: FIG. 3]

Subsequently, the bit contracting unit 11 will be described with reference to FIG. 3. FIG. 3 is a constructional block diagram of the bit contracting unit.

As shown in FIG. 3, the bit contracting unit 11 is constructed by: a register 111 of ($n+\log_2 N$) bits; an arithmetic operating unit 112; and a register 113 of n bits.

The arithmetic operating unit 112 removes $\log_2 N$ bits from ($n+\log_2 N$) bits of data in the register 111 and outputs data of n bits to the register 113.

Specifically speaking, a bit contraction in which the upper $\log_2 N$ bits excluding a sign bit (head) in the ($n+\log_2 N$) bits are deleted and the data of n bits is formed is executed.

For example, a process for converting six bits "000111" into four bits "0111" is realized by removing the second and third bits from the head bit.

A process for converting six bits "111000" into four bits "1000" is realized by removing the second and third bits from the head bit.

[Operation]

The operation of the present apparatus will now be described.

Since the resolution of the A/D converting unit 3 of the remote unit 1 is equal to n bits, a range of $-2^{n-1}$ to ($2^{n-1}-1$) can be obtained in the complement format of 2.

For example, since the resolution is equal to 14 bits, a range of −8192 to 8191 can be obtained in the complement format of 2.

In the adding unit 7 of the base unit 5, since the signals from the N remote units are added, a range of $N \cdot (-2^{n-1})$ to $N \cdot (2^{n-1}-1)$ can be obtained after the addition. However, if the process is executed while keeping the number of bits to n, an overflow may occur.

For example, assuming that N=4 and n=14, a range of −32768 to 32764 can be obtained after the addition. However, if the number of bits is held to 14, an overflow may occur.

In the bit extending unit 6, the number of bits is extended from n bits to ($n+\log_2 N$) bits (fractions below a decimal point are rounded up) in accordance with the number N of connected remote units before the addition and, thereafter, an adding process is executed in the adding unit 7.

In the above example, 14 bits are extended to 16 bits and the adding process is executed.

An arithmetic operation in which an absolute value obtained after the addition in the adding unit 7 is equal to ($2^{n-1}-1$)/|addition result| is executed in the gain arithmetic operating unit 9. If an arithmetic operation value (arithmetic operation gain) is equal to or larger than "1", "1" is outputted as a gain coefficient. If the arithmetic operation value (arithmetic operation gain) is smaller than "1", the arithmetic operation value is outputted as a gain coefficient.

In the delay unit 8, a signal from the adding unit 7 is delayed by a time equal to a processing time lag of the gain arithmetic operating unit 9. In the multiplying unit 10, a signal from the delay unit 8 is multiplied by a signal from the gain arithmetic operating unit 9.

In the multiplying unit 10, an arithmetic operation of (gain coefficient)×(addition result) is executed. Specifically speaking, when (the arithmetic operation gain)≧1, (1)×(addition result) is executed, and if (the arithmetic operation gain)<1, an arithmetic operation of $\{(2^{n-1}-1)/|\text{addition result}|\} \times$(addition result) is executed.

A process for discarding the upper $\log_2 N$ bits (fractions below a decimal point are rounded up) and returning the input signal to the original number n of bits is executed in the bit contracting unit 11.

In the above example, upper 2 bits excluding the sign bit are discarded and the input signal is returned to 14 bits equal to the original number of bits.

[Processes of Gain Arithmetic Operating Unit: FIG. 4]

Processes in the gain arithmetic operating unit 9 will be described with reference to FIG. 4. FIG. 4 is a flowchart showing the processes in the gain arithmetic operating unit.

The gain arithmetic operating unit 9 is realized by an arithmetic operating circuit and the processes shown in FIG. 4 are executed.

Specifically speaking, as shown in FIG. 4, the addition result is inputted from the adding unit 7 (S1) and an absolute value |addition result| is obtained (S2). Subsequently, an arithmetic operation of (arithmetic operation gain)= ($2^{n-1}-1$)/|addition result| is executed (S3).

Whether or not 1≦(arithmetic operation gain) is determined (S4). If 1>(arithmetic operation gain) (If NO in S4), the arithmetic operation gain is outputted as a gain coefficient (S5).

If 1≦(arithmetic operation gain) (If YES in S4), "1" is outputted as a gain coefficient (S6) and the processing routine is finished.

[Another Embodiment: FIG. 5]

Subsequently, a digital transmission apparatus (another apparatus) according to another embodiment will be described with reference to FIG. 5. FIG. 5 is a constructional block diagram of the digital transmission apparatus according to another embodiment.

Another apparatus is fundamentally similar to the present apparatus of FIG. 1 as illustrated in FIG. 5 except for a different point that a window filter 15 is provided between the multiplying unit 10 and the bit contracting unit 11 and input data is multiplied by a window function, thereby eliminating discontinuity of the data.

As a window filter, a filter of a Hamming window or a Kaiser window is well known and there is such an effect that a spurious becomes difficult to appear.

The window filter 15 may be provided between the bit contracting unit 11 and the D/A converting unit 12.

[Advantages of Embodiments]

According to the present apparatus and another apparatus, since the gain coefficient is arithmetically operated in the gain arithmetic operating unit 9 in accordance with the value obtained after the addition in the adding unit 7 and multiplied in the multiplying unit 10, there is such an effect that the maximum S/N ratio can be obtained at the resolution of n bits of the A/D converting unit 3 of the remote unit 1 and at an arbitrary signal level.

According to another apparatus, by providing the window filter 15, there is such an effect that the discontinuity of the data is solved and the occurrence of the spurious can be suppressed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A digital transmission apparatus having a base unit for receiving n-bit digital signals from a plurality of (N) remote units, synthesizing said digital signals, and transmitting the digital synthesized signals, wherein said base unit comprises:

a plurality of (N) bit extending units each for extending the digital signal from each of said remote units from n bits to $(n+\log_2 N)$ bits;

an adding unit for adding signals from said bit extending units;

a gain arithmetic operating unit for executing an arithmetic operation of $(2^{n-1}-1)/|\text{addition result}|$ by using an addition result added by said adding unit, setting the arithmetic operation result into a gain coefficient when an arithmetic operation result is smaller than "1", and setting "1" into the gain coefficient when said arithmetic operation result is equal to or larger than "1";

a multiplying unit for multiplying said addition result by the gain coefficient obtained by said gain arithmetic operating unit;

a bit contracting unit for discarding upper log2N bits excluding a sign bit with respect to data multiplied by said multiplying unit and returning the data to n bits;

a D/A converting unit for converting a signal from said bit contracting unit from the digital signal into an analog signal; and a wireless unit for frequency converting the signal from said D/A converting unit and amplifying the frequency converted signal.

2. The digital transmission apparatus according to claim 1, further comprising:

a window filter between said multiplying unit and said bit contracting unit, wherein an input of said window filter is multiplied by a window function.

3. The digital transmission apparatus according to claim 1, further comprising:

a window filter between said bit contracting unit and said D/A converting unit, wherein an input of said window filter is multiplied by a window function.

* * * * *